US010554689B2

(12) United States Patent
Reddy et al.

(10) Patent No.: US 10,554,689 B2
(45) Date of Patent: Feb. 4, 2020

(54) SECURE COMMUNICATION SESSION RESUMPTION IN A SERVICE FUNCTION CHAIN

(71) Applicant: Cisco Technology, Inc., San Jose, CA (US)

(72) Inventors: K Tirumaleswar Reddy, Karnataka (IN); Prashanth Patil, San Jose, CA (US); Carlos M. Pignataro, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 139 days.

(21) Appl. No.: 15/582,026

(22) Filed: Apr. 28, 2017

(65) Prior Publication Data

US 2018/0316724 A1    Nov. 1, 2018

(51) Int. Cl.
*H04L 29/06*    (2006.01)

(52) U.S. Cl.
CPC ........ *H04L 63/166* (2013.01); *H04L 63/0435* (2013.01)

(58) Field of Classification Search
CPC .. H04L 63/166; H04L 9/0819; H04L 63/0435
See application file for complete search history.

(56) References Cited

U.S. PATENT DOCUMENTS 3,629,512 A    12/1971  Yuan
4,769,811 A    9/1988   Eckberg, Jr. et al.
(Continued)

FOREIGN PATENT DOCUMENTS

CN    103716123    4/2014
CN    103716137    4/2014
(Continued)

OTHER PUBLICATIONS

3GPP TR 23.401 V9.5.0 (Jun. 2010) Technical Specification: Group Services and Systems Aspects; General Packet Radio Service (GPRS) Enhancements for Evolved Universal Terrestrial Radio Access Network (E-UTRAN) Access (Release 9), 3rd Generation Partnership Project (3GPP), 650 Route des Lucioles—Sophia Antipolis Valbonne—France, Jun. 2010; 259 pages.
(Continued)

*Primary Examiner* — Meng Li
(74) *Attorney, Agent, or Firm* — Polsinelli PC (57) ABSTRACT

A method for resuming a Transport Layer Security (TLS) session in a Service Function Chain comprising a plurality of Service Function nodes coupled to a Service Function Forwarder. A request is received at a first Service Function node to establish a TLS session, and a Pre-Shared Key (PSK) and a PSK identifier that uniquely correspond to the first Service Function node and the TLS session are generated. The PSK identifier is forwarded to one or more of the Service Function Forwarder and the plurality of Service Function nodes. A request to resume the TLS session is received from a client device that previously disconnected. It is determined that the connection request contains the PSK identifier, a second Service Function node is selected, and the TLS session is re-established between the client device and the second Service Function node using the same PSK as the prior TLS session.

16 Claims, 6 Drawing Sheets

(56) References Cited

U.S. PATENT DOCUMENTS

| | | |
|---|---|---|
| 5,408,231 A | 4/1995 | Bowdon |
| 5,491,690 A | 2/1996 | Alfonsi et al. |
| 5,557,609 A | 9/1996 | Shobatake et al. |
| 5,600,638 A | 2/1997 | Bertin et al. |
| 5,687,167 A | 11/1997 | Bertin et al. |
| 6,115,384 A | 9/2000 | Parzych |
| 6,167,438 A | 12/2000 | Yates et al. |
| 6,400,681 B1 | 6/2002 | Bertin et al. |
| 6,661,797 B1 | 12/2003 | Goel et al. |
| 6,687,229 B1 | 2/2004 | Kataria et al. |
| 6,799,270 B1 | 9/2004 | Bull et al. |
| 6,888,828 B1 | 5/2005 | Partanen et al. |
| 6,993,593 B2 | 1/2006 | Iwata |
| 7,027,408 B2 | 4/2006 | Nabkel et al. |
| 7,062,567 B2 | 6/2006 | Benitez et al. |
| 7,095,715 B2 | 8/2006 | Buckman et al. |
| 7,096,212 B2 | 8/2006 | Tribble et al. |
| 7,139,239 B2 | 11/2006 | Mcfarland et al. |
| 7,165,107 B2 | 1/2007 | Pouyoul et al. |
| 7,197,008 B1 | 3/2007 | Shabtay et al. |
| 7,197,660 B1 | 3/2007 | Liu et al. |
| 7,209,435 B1 | 4/2007 | Kuo et al. |
| 7,227,872 B1 | 6/2007 | Biswas et al. |
| 7,231,462 B2 | 6/2007 | Berthaud et al. |
| 7,333,990 B1 | 2/2008 | Thiagarajan et al. |
| 7,443,796 B1 | 10/2008 | Albert et al. |
| 7,458,084 B2 | 11/2008 | Zhang et al. |
| 7,472,411 B2 | 12/2008 | Wing et al. |
| 7,486,622 B2 | 2/2009 | Regan et al. |
| 7,536,396 B2 | 5/2009 | Johnson et al. |
| 7,552,201 B2 | 6/2009 | Areddu et al. |
| 7,558,261 B2 | 7/2009 | Arregoces et al. |
| 7,567,504 B2 | 7/2009 | Darling et al. |
| 7,571,470 B2 | 8/2009 | Arregoces et al. |
| 7,573,879 B2 | 8/2009 | Narad et al. |
| 7,610,375 B2 | 10/2009 | Portolani et al. |
| 7,643,468 B1 | 1/2010 | Arregoces et al. |
| 7,644,182 B2 | 1/2010 | Banerjee et al. |
| 7,647,422 B2 | 1/2010 | Singh et al. |
| 7,657,898 B2 | 2/2010 | Sadiq |
| 7,657,940 B2 | 2/2010 | Portolani et al. |
| 7,668,116 B2 | 2/2010 | Wijnands et al. |
| 7,684,321 B2 | 3/2010 | Muirhead et al. |
| 7,738,469 B1 | 6/2010 | Shekokar et al. |
| 7,751,409 B1 | 7/2010 | Carolan |
| 7,793,157 B2 | 9/2010 | Bailey et al. |
| 7,814,284 B1 | 10/2010 | Glass et al. |
| 7,831,693 B2 | 11/2010 | Lai |
| 7,852,785 B2 | 12/2010 | Lund et al. |
| 7,860,095 B2 | 12/2010 | Forissier et al. |
| 7,860,100 B2 | 12/2010 | Khalid et al. |
| 7,895,425 B2 | 2/2011 | Khalid et al. |
| 7,899,012 B2 | 3/2011 | Ho et al. |
| 7,899,861 B2 | 3/2011 | Feblowitz et al. |
| 7,907,595 B2 | 3/2011 | Khanna et al. |
| 7,908,480 B2 | 3/2011 | Firestone et al. |
| 7,983,174 B1 | 7/2011 | Monaghan et al. |
| 7,990,847 B1 | 8/2011 | Leroy et al. |
| 8,000,329 B2 | 8/2011 | Fendick et al. |
| 8,018,938 B1 | 9/2011 | Fromm et al. |
| 8,094,575 B1 | 1/2012 | Vadlakonda et al. |
| 8,095,683 B2 | 1/2012 | Balasubramaniam Chandra |
| 8,116,307 B1 | 2/2012 | Thesayi et al. |
| 8,166,465 B2 | 4/2012 | Feblowitz et al. |
| 8,180,909 B2 | 5/2012 | Hartman et al. |
| 8,191,119 B2 | 5/2012 | Wing et al. |
| 8,195,774 B2 | 6/2012 | Lambeth et al. |
| 8,280,354 B2 | 10/2012 | Smith et al. |
| 8,281,302 B2 | 10/2012 | Durazzo et al. |
| 8,291,108 B2 | 10/2012 | Raja et al. |
| 8,305,900 B2 | 11/2012 | Bianconi |
| 8,311,045 B2 | 11/2012 | Quinn et al. |
| 8,316,457 B1 | 11/2012 | Paczkowski et al. |
| 8,355,332 B2 | 1/2013 | Beaudette et al. |
| 8,442,043 B2 | 5/2013 | Sharma et al. |
| 8,451,817 B2 | 5/2013 | Cheriton |
| 8,464,336 B2 | 6/2013 | Wei et al. |
| 8,473,981 B1 | 6/2013 | Gargi |
| 8,479,298 B2 | 7/2013 | Keith et al. |
| 8,498,414 B2 | 7/2013 | Rossi |
| 8,520,672 B2 | 8/2013 | Guichard et al. |
| 8,601,152 B1 | 12/2013 | Chou |
| 8,605,588 B2 | 12/2013 | Sankaran et al. |
| 8,612,612 B1 | 12/2013 | Dukes et al. |
| 8,627,328 B2 | 1/2014 | Mousseau et al. |
| 8,645,952 B2 | 2/2014 | Biswas et al. |
| 8,676,965 B2 | 3/2014 | Gueta |
| 8,676,980 B2 | 3/2014 | Kreeger et al. |
| 8,700,892 B2 | 4/2014 | Bollay et al. |
| 8,724,466 B2 | 5/2014 | Kenigsberg et al. |
| 8,730,980 B2 | 5/2014 | Bagepalli et al. |
| 8,743,885 B2 | 6/2014 | Khan et al. |
| 8,751,420 B2 | 6/2014 | Hjelm et al. |
| 8,762,534 B1 | 6/2014 | Hong et al. |
| 8,762,707 B2 | 6/2014 | Killian et al. |
| 8,792,490 B2 | 7/2014 | Jabr et al. |
| 8,793,400 B2 | 7/2014 | Mcdysan et al. |
| 8,812,730 B2 | 8/2014 | Vos et al. |
| 8,819,419 B2 | 8/2014 | Carlson et al. |
| 8,825,070 B2 | 9/2014 | Akhtar et al. |
| 8,830,834 B2 | 9/2014 | Sharma et al. |
| 8,904,037 B2 | 12/2014 | Haggar et al. |
| 8,984,284 B2 | 3/2015 | Purdy, Sr. et al. |
| 9,001,827 B2 | 4/2015 | Appenzeller |
| 9,071,533 B2 | 6/2015 | Hui et al. |
| 9,077,661 B2 | 7/2015 | Andreasen et al. |
| 9,088,584 B2 | 7/2015 | Feng et al. |
| 9,130,872 B2 | 9/2015 | Kumar et al. |
| 9,143,438 B2 | 9/2015 | Khan et al. |
| 9,160,797 B2 | 10/2015 | Mcdysan |
| 9,178,812 B2 | 11/2015 | Guichard et al. |
| 9,189,285 B2 | 11/2015 | Ng et al. |
| 9,203,711 B2 | 12/2015 | Agarwal et al. |
| 9,253,274 B2 | 2/2016 | Quinn et al. |
| 9,300,579 B2 | 3/2016 | Frost et al. |
| 9,300,585 B2 | 3/2016 | Kumar et al. |
| 9,311,130 B2 | 4/2016 | Christenson et al. |
| 9,319,324 B2 | 4/2016 | Beheshti-Zavareh et al. |
| 9,325,565 B2 | 4/2016 | Yao et al. |
| 9,338,097 B2 | 5/2016 | Anand et al. |
| 9,344,337 B2 | 5/2016 | Kumar et al. |
| 9,374,297 B2 | 6/2016 | Bosch et al. |
| 9,379,931 B2 | 6/2016 | Bosch et al. |
| 9,385,950 B2 | 7/2016 | Quinn et al. |
| 9,398,486 B2 | 7/2016 | La Roche, Jr. et al. |
| 9,407,540 B2 | 8/2016 | Kumar et al. |
| 9,413,655 B2 | 8/2016 | Shatzkamer et al. |
| 9,424,065 B2 | 8/2016 | Singh et al. |
| 9,436,443 B2 | 9/2016 | Chiosi et al. |
| 9,444,675 B2 | 9/2016 | Guichard et al. |
| 9,473,570 B2 | 10/2016 | Bhanujan et al. |
| 9,479,443 B2 | 10/2016 | Bosch et al. |
| 9,491,094 B2 | 11/2016 | Patwardhan et al. |
| 9,537,836 B2 | 1/2017 | Maller et al. |
| 9,558,029 B2 | 1/2017 | Behera et al. |
| 9,559,970 B2 | 1/2017 | Kumar et al. |
| 9,571,405 B2 | 2/2017 | Pignataro et al. |
| 9,608,896 B2 | 3/2017 | Kumar et al. |
| 9,614,739 B2 | 4/2017 | Kumar et al. |
| 9,660,909 B2 | 5/2017 | Guichard et al. |
| 9,723,106 B2 | 8/2017 | Shen et al. |
| 9,774,533 B2 | 9/2017 | Zhang et al. |
| 9,794,379 B2 | 10/2017 | Kumar et al. |
| 9,825,911 B1 * | 11/2017 | Brandwine ......... H04L 63/0236 |
| 9,882,776 B2 | 1/2018 | Aybay et al. |
| 9,929,945 B2 | 3/2018 | Schultz et al. |
| 10,003,530 B2 | 6/2018 | Zhang et al. |
| 2001/0023442 A1 | 9/2001 | Masters |
| 2002/0085562 A1 | 7/2002 | Hufferd et al. |
| 2002/0131362 A1 | 9/2002 | Callon |
| 2002/0156893 A1 | 10/2002 | Pouyoul et al. |
| 2002/0167935 A1 | 11/2002 | Nabkel et al. |
| 2003/0023879 A1 | 1/2003 | Wray |
| 2003/0026257 A1 | 2/2003 | Xu et al. |

(56) References Cited

U.S. PATENT DOCUMENTS

| | | |
|---|---|---|
| 2003/0037070 A1 | 2/2003 | Marston |
| 2003/0088698 A1 | 5/2003 | Singh et al. |
| 2003/0110081 A1 | 6/2003 | Tosaki et al. |
| 2003/0120816 A1 | 6/2003 | Berthaud et al. |
| 2003/0214913 A1 | 11/2003 | Kan et al. |
| 2003/0226142 A1 | 12/2003 | Rand |
| 2004/0109412 A1 | 6/2004 | Hansson et al. |
| 2004/0148391 A1 | 7/2004 | Lake, Sr. et al. |
| 2004/0199812 A1 | 10/2004 | Earl |
| 2004/0213160 A1 | 10/2004 | Regan et al. |
| 2004/0264481 A1 | 12/2004 | Darling et al. |
| 2004/0268357 A1 | 12/2004 | Joy et al. |
| 2005/0044197 A1 | 2/2005 | Lai |
| 2005/0058118 A1 | 3/2005 | Davis |
| 2005/0060572 A1 | 3/2005 | Kung |
| 2005/0086367 A1 | 4/2005 | Conta et al. |
| 2005/0120101 A1 | 6/2005 | Nocera |
| 2005/0152378 A1 | 7/2005 | Bango et al. |
| 2005/0157645 A1 | 7/2005 | Rabie et al. |
| 2005/0160180 A1 | 7/2005 | Rabje et al. |
| 2005/0204042 A1 | 9/2005 | Banerjee et al. |
| 2005/0210096 A1 | 9/2005 | Bishop et al. |
| 2005/0257002 A1 | 11/2005 | Nguyen |
| 2005/0281257 A1 | 12/2005 | Yazaki et al. |
| 2005/0286540 A1 | 12/2005 | Hurtta et al. |
| 2005/0289244 A1 | 12/2005 | Sahu et al. |
| 2006/0005240 A1 | 1/2006 | Sundarrajan et al. |
| 2006/0031374 A1 | 2/2006 | Lu et al. |
| 2006/0045024 A1 | 3/2006 | Previdi et al. |
| 2006/0074502 A1 | 4/2006 | Mcfarland |
| 2006/0092950 A1 | 5/2006 | Arregoces et al. |
| 2006/0095960 A1 | 5/2006 | Arregoces et al. |
| 2006/0112400 A1 | 5/2006 | Zhang et al. |
| 2006/0155862 A1 | 7/2006 | Kathi et al. |
| 2006/0168223 A1 | 7/2006 | Mishra et al. |
| 2006/0233106 A1 | 10/2006 | Achlioptas et al. |
| 2006/0233155 A1 | 10/2006 | Srivastava |
| 2007/0061441 A1 | 3/2007 | Landis et al. |
| 2007/0067435 A1 | 3/2007 | Landis et al. |
| 2007/0094397 A1 | 4/2007 | Krelbaum et al. |
| 2007/0143851 A1 | 6/2007 | Nicodemus et al. |
| 2007/0237147 A1 | 10/2007 | Quinn et al. |
| 2007/0250836 A1 | 10/2007 | Li et al. |
| 2008/0056153 A1 | 3/2008 | Liu |
| 2008/0080509 A1 | 4/2008 | Khanna et al. |
| 2008/0080517 A1 | 4/2008 | Roy et al. |
| 2008/0170542 A1 | 7/2008 | Hu |
| 2008/0177896 A1 | 7/2008 | Quinn et al. |
| 2008/0181118 A1 | 7/2008 | Sharma et al. |
| 2008/0196083 A1 | 8/2008 | Parks et al. |
| 2008/0209039 A1 | 8/2008 | Tracey et al. |
| 2008/0219287 A1 | 9/2008 | Krueger et al. |
| 2008/0225710 A1 | 9/2008 | Raja et al. |
| 2008/0291910 A1 | 11/2008 | Tadimeti et al. |
| 2009/0003364 A1 | 1/2009 | Fendick et al. |
| 2009/0006152 A1 | 1/2009 | Timmerman et al. |
| 2009/0037713 A1 | 2/2009 | Khalid et al. |
| 2009/0094684 A1 | 4/2009 | Chinnusamy et al. |
| 2009/0204612 A1 | 8/2009 | Keshavarz-nia et al. |
| 2009/0271656 A1 | 10/2009 | Yokota et al. |
| 2009/0300207 A1 | 12/2009 | Giaretta et al. |
| 2009/0305699 A1 | 12/2009 | Deshpande et al. |
| 2009/0328054 A1 | 12/2009 | Paramasivam et al. |
| 2010/0058329 A1 | 3/2010 | Durazzo et al. |
| 2010/0063988 A1 | 3/2010 | Khalid |
| 2010/0080226 A1 | 4/2010 | Khalid |
| 2010/0165985 A1 | 7/2010 | Sharma et al. |
| 2010/0191612 A1 | 7/2010 | Raleigh |
| 2010/0211658 A1 | 8/2010 | Hoogerwerf et al. |
| 2011/0023090 A1 | 1/2011 | Asati et al. |
| 2011/0032833 A1 | 2/2011 | Zhang et al. |
| 2011/0055845 A1 | 3/2011 | Nandagopal et al. |
| 2011/0131338 A1 | 6/2011 | Hu |
| 2011/0137991 A1 | 6/2011 | Russell et al. |
| 2011/0142056 A1 | 6/2011 | Manoj |
| 2011/0161494 A1 | 6/2011 | Mcdysan et al. |
| 2011/0222412 A1 | 9/2011 | Kompella |
| 2011/0255538 A1 | 10/2011 | Srinivasan et al. |
| 2011/0267947 A1 | 11/2011 | Dhar et al. |
| 2012/0016977 A1* | 1/2012 | Robertson ............... H04L 63/20 709/224 |
| 2012/0131662 A1 | 5/2012 | Kuik et al. |
| 2012/0147894 A1 | 6/2012 | Mulligan et al. |
| 2012/0324442 A1 | 12/2012 | Barde |
| 2012/0331135 A1 | 12/2012 | Alon et al. |
| 2013/0003735 A1 | 1/2013 | Chao et al. |
| 2013/0003736 A1 | 1/2013 | Szyszko et al. |
| 2013/0040640 A1 | 2/2013 | Chen et al. |
| 2013/0044636 A1 | 2/2013 | Koponen et al. |
| 2013/0121137 A1 | 5/2013 | Feng et al. |
| 2013/0124708 A1 | 5/2013 | Lee et al. |
| 2013/0163594 A1 | 6/2013 | Sharma et al. |
| 2013/0163606 A1 | 6/2013 | Bagepalli et al. |
| 2013/0238806 A1 | 9/2013 | Moen |
| 2013/0272305 A1 | 10/2013 | Lefebvre et al. |
| 2013/0311675 A1 | 11/2013 | Kancherla |
| 2013/0329584 A1 | 12/2013 | Ghose et al. |
| 2014/0010083 A1 | 1/2014 | Hamdi et al. |
| 2014/0010096 A1 | 1/2014 | Kamble et al. |
| 2014/0036730 A1 | 2/2014 | Nellikar et al. |
| 2014/0050223 A1 | 2/2014 | Foo et al. |
| 2014/0067758 A1 | 3/2014 | Boldyrev et al. |
| 2014/0105062 A1 | 4/2014 | McDysan et al. |
| 2014/0181267 A1 | 6/2014 | Wadkins et al. |
| 2014/0254603 A1 | 9/2014 | Banavalikar et al. |
| 2014/0259012 A1 | 9/2014 | Nandlall et al. |
| 2014/0279863 A1 | 9/2014 | Krishnamurthy et al. |
| 2014/0280836 A1 | 9/2014 | Kumar et al. |
| 2014/0286354 A1* | 9/2014 | Van De Poel .......... G06F 9/542 370/463 |
| 2014/0317261 A1 | 10/2014 | Shatzkamer et al. |
| 2014/0321459 A1 | 10/2014 | Kumar et al. |
| 2014/0334295 A1 | 11/2014 | Guichard et al. |
| 2014/0344439 A1 | 11/2014 | Kempf et al. |
| 2014/0362682 A1 | 12/2014 | Guichard et al. |
| 2014/0362857 A1 | 12/2014 | Guichard et al. |
| 2014/0369209 A1 | 12/2014 | Khurshid et al. |
| 2014/0376558 A1 | 12/2014 | Rao et al. |
| 2015/0003455 A1 | 1/2015 | Haddad et al. |
| 2015/0012584 A1 | 1/2015 | Lo et al. |
| 2015/0012988 A1 | 1/2015 | Jeng et al. |
| 2015/0029871 A1 | 1/2015 | Frost et al. |
| 2015/0032871 A1 | 1/2015 | Allan et al. |
| 2015/0052516 A1 | 2/2015 | French et al. |
| 2015/0071285 A1 | 3/2015 | Kumar et al. |
| 2015/0074276 A1 | 3/2015 | DeCusatis et al. |
| 2015/0082308 A1 | 3/2015 | Kiess et al. |
| 2015/0085635 A1 | 3/2015 | Wijnands et al. |
| 2015/0085870 A1 | 3/2015 | Narasimha et al. |
| 2015/0089082 A1 | 3/2015 | Patwardhan et al. |
| 2015/0092564 A1 | 4/2015 | Aldrin |
| 2015/0103827 A1 | 4/2015 | Quinn et al. |
| 2015/0117308 A1 | 4/2015 | Kant |
| 2015/0124622 A1 | 5/2015 | Kovvali et al. |
| 2015/0131484 A1 | 5/2015 | Aldrin |
| 2015/0131660 A1 | 5/2015 | Shepherd et al. |
| 2015/0156035 A1 | 6/2015 | Foo et al. |
| 2015/0180725 A1 | 6/2015 | Varney et al. |
| 2015/0180767 A1 | 6/2015 | Tam et al. |
| 2015/0181309 A1 | 6/2015 | Shepherd et al. |
| 2015/0188949 A1 | 7/2015 | Mahaffey et al. |
| 2015/0195197 A1 | 7/2015 | Yong et al. |
| 2015/0222516 A1 | 8/2015 | Deval et al. |
| 2015/0222533 A1 | 8/2015 | Birrittella et al. |
| 2015/0236948 A1 | 8/2015 | Dunbar et al. |
| 2015/0319078 A1 | 11/2015 | Lee et al. |
| 2015/0319081 A1 | 11/2015 | Kasturi et al. |
| 2015/0326473 A1 | 11/2015 | Dunbar et al. |
| 2015/0333930 A1 | 11/2015 | Aysola et al. |
| 2015/0334027 A1 | 11/2015 | Bosch et al. |
| 2015/0341285 A1 | 11/2015 | Aysola et al. |
| 2015/0365495 A1 | 12/2015 | Fan et al. |
| 2015/0381465 A1 | 12/2015 | Narayanan et al. |
| 2015/0381557 A1 | 12/2015 | Fan et al. |

(56) References Cited

U.S. PATENT DOCUMENTS

| | | | |
|---|---|---|---|
| 2016/0014016 | A1* | 1/2016 | Guichard ............... H04L 45/04 709/226 |
| 2016/0028604 | A1 | 1/2016 | Chakrabarti et al. |
| 2016/0028640 | A1 | 1/2016 | Zhang et al. |
| 2016/0043952 | A1 | 2/2016 | Zhang et al. |
| 2016/0050117 | A1 | 2/2016 | Voellmy et al. |
| 2016/0050132 | A1 | 2/2016 | Zhang |
| 2016/0080263 | A1 | 3/2016 | Park et al. |
| 2016/0099853 | A1 | 4/2016 | Nedeltchev et al. |
| 2016/0119159 | A1 | 4/2016 | Zhao et al. |
| 2016/0119253 | A1 | 4/2016 | Kang et al. |
| 2016/0127139 | A1 | 5/2016 | Tian et al. |
| 2016/0134518 | A1 | 5/2016 | Callon et al. |
| 2016/0134535 | A1 | 5/2016 | Callon |
| 2016/0139939 | A1 | 5/2016 | Bosch et al. |
| 2016/0164776 | A1 | 6/2016 | Biancaniello |
| 2016/0165014 | A1 | 6/2016 | Nainar et al. |
| 2016/0173373 | A1 | 6/2016 | Guichard et al. |
| 2016/0173464 | A1 | 6/2016 | Wang et al. |
| 2016/0182336 | A1 | 6/2016 | Doctor et al. |
| 2016/0182342 | A1 | 6/2016 | Singaravelu et al. |
| 2016/0182684 | A1 | 6/2016 | Connor et al. |
| 2016/0212017 | A1 | 7/2016 | Li et al. |
| 2016/0226742 | A1 | 8/2016 | Apathotharanan et al. |
| 2016/0248685 | A1 | 8/2016 | Pignataro et al. |
| 2016/0277250 | A1 | 9/2016 | Maes |
| 2016/0285720 | A1 | 9/2016 | Mäenpää et al. |
| 2016/0315916 | A1* | 10/2016 | Rothstein ............ H04L 63/0428 |
| 2016/0323165 | A1 | 11/2016 | Boucadair et al. |
| 2016/0352629 | A1 | 12/2016 | Wang et al. |
| 2016/0380966 | A1 | 12/2016 | Gunnalan et al. |
| 2017/0019303 | A1 | 1/2017 | Swamy et al. |
| 2017/0031804 | A1 | 2/2017 | Ciszewski et al. |
| 2017/0078175 | A1 | 3/2017 | Xu et al. |
| 2017/0126643 | A1* | 5/2017 | Wood ................... H04L 9/0861 |
| 2017/0187609 | A1 | 6/2017 | Lee et al. |
| 2017/0208000 | A1 | 7/2017 | Bosch et al. |
| 2017/0214627 | A1 | 7/2017 | Zhang et al. |
| 2017/0237656 | A1 | 8/2017 | Gage et al. |
| 2017/0250917 | A1 | 8/2017 | Ruckstuhl et al. |
| 2017/0272470 | A1 | 9/2017 | Gundamaraju et al. |
| 2017/0279712 | A1 | 9/2017 | Nainar et al. |
| 2017/0310611 | A1 | 10/2017 | Kumar et al. |
| 2017/0331741 | A1 | 11/2017 | Fedyk et al. |
| 2018/0013841 | A1 | 1/2018 | Nainar et al. |
| 2018/0026884 | A1 | 1/2018 | Nainar et al. |
| 2018/0026887 | A1 | 1/2018 | Nainar et al. |
| 2018/0041470 | A1 | 2/2018 | Schultz et al. |
| 2018/0062991 | A1 | 3/2018 | Nainar et al. |
| 2018/0198823 | A1* | 7/2018 | Johansson ............. H04L 63/166 |

FOREIGN PATENT DOCUMENTS

| | | | |
|---|---|---|---|
| EP | 3160073 | A1 | 4/2017 |
| JP | 2016149686 | | 8/2016 |
| WO | WO-2011029321 | A1 | 3/2011 |
| WO | WO 2012/056404 | | 5/2012 |
| WO | WO 2015/065353 | | 5/2015 |
| WO | WO 2015/180559 | | 12/2015 |
| WO | WO 2015/187337 | | 12/2015 |
| WO | WO-2016004556 | A1 | 1/2016 |
| WO | WO 2016/058245 | | 4/2016 |
| WO | WO 2017/011607 | | 1/2017 |

OTHER PUBLICATIONS

3GPP TR 23.803 V7.0.0 (Sep. 2005) Technical Specification: Group Services and System Aspects; Evolution of Policy Control and Charging (Release 7), 3rd Generation Partnership Project (3GPP), 650 Route des Lucioles—Sophia Antipolis Val bonne—France, Sep. 2005; 30 pages.

3GPP TS 23.203 V8.9.0 (Mar. 2010) Technical Specification: Group Services and System Aspects; Policy and Charging Control Architecture (Release 8), 3rd Generation Partnership Project (3GPP), 650 Route des Lucioles—Sophia Antipolis Val bonne—France, Mar. 2010; 116 pages.

3GPP TS 23.401 V13.5.0 (Dec. 2015) Technical Specification: 3rd Generation Partnership Project; Technical Specification Group Services and System Aspects; General Packet Radio Service (GPRS) enhancements for Evolved Universal Terrestrial Radio Access Network (E-UTRAN) access (Release 13), 3GPP, 650 Route des Lucioles—Sophia Antipolis Valbonne—France, Dec. 2015.

3GPP TS 29.212 V13.1.0 (Mar. 2015) Technical Specification: 3rd Generation Partnership Project; Technical Specification Group Core Network and Terminals; Policy and Chargig Control (PCC); Reference points (Release 13), 3rd Generation Partnership Project (3GPP), 650 Route des Lucioles—Sophia Antipolis Valbonne—France, Mar. 2015; 230 pages.

U.S. Appl. No. 15/252,028, filed Aug. 30, 2016, entitled "System and Method for Managing Chained Services in a Network Environment," Inventor(s): Hendrikus G.P. Bosch, et al.

P. Quinn, et al., "Network Service Header," Network Working Group, Feb. 14, 2014, 21 pages; https://svn.tools.ietf.org/html/draft-quinn-sfc-nsh-02.

P. Quinn, et al., "Service Function Chaining (SFC) Architecture," Network Working Group, May 5, 2014, 31 pages; https://svn.tools.ietf.org/html/draft-quinn-sfc-arch-05.

International Search Report and Written Opinion from the International Searching Authority, dated Aug. 30, 2017, for the corresponding International Application No. PCT/US2017/040575, 13 pages.

Aldrin, S., et al. "Service Function Chaining Operation, Administration and Maintenance Framework," Internet Engineering Task Force, Oct. 26, 2014, 13 pages.

Author Unknown, "ANSI/SCTE 35 2007 Digital Program Insertion Cueing Message for Cable," Engineering Committee, Digital Video Subcommittee, American National Standard, Society of Cable Telecommunications Engineers, © Society of Cable Telecommunications Engineers, Inc. 2007 All Rights Reserved, 140 Philips Road, Exton, PA 19341; 42 pages.

Author Unknown, "AWS Lambda Developer Guide," Amazon Web Services Inc., May 2017, 416 pages.

Author Unknown, "CEA-708," from Wikipedia, the free encyclopedia, Nov. 15, 2012; 16 pages http://en.wikipedia.org/w/index.php?title=CEA-708&oldid=523143431.

Author Unknown, "Cisco and Intel High-Performance VNFs on Cisco NFV Infrastructure," White Paper, Cisco and Intel, Oct. 2016, 7 pages.

Author Unknown, "Cloud Functions Overview," Cloud Functions Documentation, Mar. 21, 2017, 3 pages; https://cloud.google.com/functions/docs/concepts/overview.

Author Unknown, "Cloud-Native VNF Modelling," Open Source Mano, © ETSI 2016, 18 pages.

Author Unknown, "Digital Program Insertion," from Wikipedia, the free encyclopedia, Jan. 2, 2012; 1 page http://en.wikipedia.org/w/index.php?title=Digital_Program_Insertion&oldid=469076482.

Author Unknown, "Dynamic Adaptive Streaming over HTTP," from Wikipedia, the free encyclopedia, Oct. 25, 2012; 3 pages, http://en.wikipedia.org/w/index.php?title=Dynannic_Adaptive_Streanning_over_HTTP&oldid=519749189.

Author Unknown, "GStreamer and in-band metadata," from RidgeRun Developer Connection, Jun. 19, 2012, 5 pages https://developersidgerun.conn/wiki/index.php/GStreanner_and_in-band_nnetadata.

Author Unknown, "ISO/IEC JTC 1/SC 29, Information Technology—Dynamic Adaptive Streaming over HTTP (DASH)—Part 1: Media Presentation Description and Segment Formats," International Standard © ISO/IEC 2012—All Rights Reserved; Jan. 5, 2012; 131 pages.

Author Unknown, "M-PEG 2 Transmission," © Dr. Gorry Fairhurst, 9 pages [Published on or about Jan. 12, 2012] http://www.erg.abdn.ac.uk/future-net/digital-video/mpeg2-trans.html.

Author Unknown, "MPEG Transport Stream," from Wikipedia, the free encyclopedia, Nov. 11, 2012; 7 pages, http://en.wikipedia.org/w/index.php?title=MPEG_transport_streann&oldid=522468296.

(56) References Cited

OTHER PUBLICATIONS

Author Unknown, "Network Functions Virtualisation (NFV); Use Cases," ETSI, GS NFV 001 v1.1.1, Architectural Framework, © European Telecommunications Standards Institute, Oct. 2013, 50 pages.

Author Unknown, "Understanding Azure, A Guide for Developers," Microsoft Corporation, Copyright © 2016 Microsoft Corporation, 39 pages.

Baird, Andrew, et al. "AWS Serverless Multi-Tier Architectures; Using Amazon API Gateway and AWS Lambda," Amazon Web Services Inc., Nov. 2015, 20 pages.

Boucadair, Mohamed, et al., "Differentiated Service Function Chaining Framework," Network Working Group Internet Draft draft-boucadair-network-function-chaining-03, Aug. 21, 2013, 21 pages.

Cisco Systems, Inc. "Cisco NSH Service Chaining Configuration Guide," Jul. 28, 2017, 11 pages.

Ersue, Mehmet, "ETSI NFV Management and Orchestration—An Overview," Presentation at the IETF# 88 Meeting, Nov. 3, 2013, 14 pages.

Fayaz, Seyed K., et al., "Efficient Network Reachability Analysis using a Succinct Control Plane Representation," 2016, ratul.org, pp. 1-16.

Halpern, Joel, et al., "Service Function Chaining (SFC) Architecture," Internet Engineering Task Force (IETF), Cisco, Oct. 2015, 32 pages.

Hendrickson, Scott, et al. "Serverless Computation with OpenLambda," Elastic 60, University of Wisconson, Madison, Jun. 20, 2016, 7 pages, https://www.usenix.org/system/files/conference/hotcloud16/hotcloud16_hendrikson.pdf.

Jiang, Yuanlong, et al., "Fault Management in Service Function Chaining," Network Working Group, China Telecom, Oct. 16, 2015, 13 pages.

Kumar, Surendra, et al., "Service Function Path Optimization: draft-kumar-sfc-sfp-optimization-00.txt," Internet Engineering Task Force, IETF; Standard Working Draft, May 10, 2014, 14 pages.

Penno, Reinaldo, et al. "Packet Generation in Service Function Chains," draft-penno-sfc-packet-03, Apr. 29, 2016, 25 pages.

Penno, Reinaldo, et al. "Services Function Chaining Traceroute," draft-penno-sfc-trace-03, Sep. 30, 2015, 9 pages.

Pierre-Louis, Marc-Arhtur, "OpenWhisk: A quick tech preview," DeveloperWorks Open, IBM, Feb. 22, 2016, modified Mar. 3, 2016, 7 pages; https://developer.ibm.com/open/2016/02/22/openwhisk-a-quick-tech-preview/.

Pujol, Pua Capdevila, "Deployment of NFV and SFC scenarios," EETAC, Master Thesis, Advisor: David Rincon Rivera, Universitat Politecnica De Catalunya, Feb. 17, 2017, 115 pages.

Quinn, Paul, et al., "Network Service Header," Network Working Group, draft-quinn-nsh-00.txt, Jun. 13, 2013, 20 pages.

Quinn, Paul, et al., "Network Service Header," Network Working Group Internet Draft draft-quinn-nsh-01, Jul. 12, 2013, 20 pages.

Wong, Fei, et al., "SMPTE-TT Embedded in ID3 for HTTP Live Streaming, draft-smpte-id3-http-live-streaming-00," Informational Internet Draft, Jun. 2012, 7 pages http://tools.ietf.org/htnnl/draft-snnpte-id3-http-live-streaming-00.

Yadav, Rishi, "What Real Cloud-Native Apps Will Look Like," Crunch Network, posted Aug. 3, 2016, 8 pages; https://techcrunch.com/2016/08/03what-real-cloud-native-apps-will-look-like/.

Alizadeh, Mohammad, et al., "CONGA: Distributed Congestion-Aware Load Balancing for Datacenters," SIGCOMM '14, Aug. 17-22, 2014, 12 pages.

Author Unknown, "IEEE Standard for the Functional Architecture of Next Generation Service Overlay Networks, IEEE Std. 1903-2011," IEEE, Piscataway, NJ, Oct. 7, 2011; 147 pages.

Author Unknown, "OpenNebula 4.6 User Guide," Jun. 12, 2014, opennebula.org, 87 pages.

Author Unknown, "Service-Aware Network Architecture Based on SDN, NFV, and Network Intelligence," 2014, 8 pages.

Bi, Jing, et al., "Dynamic Provisioning Modeling for Virtualized Multi-tier Applications in Cloud Data Center," 2010 IEEE $3^{rd}$ International Conference on Cloud Computing, Jul. 5, 2010, pp. 370-377, IEEE Computer Society.

Bitar, N., et al., "Interface to the Routing System (I2RS) for the Service Chaining: Use Cases and Requirements," draft-bitar-i2rs-service-chaining-01, Feb. 14, 2014, pp. 1-15.

Bremler-Barr, Anat, et al., "Deep Packet Inspection as a Service," CoNEXT '14, Dec. 2-5, 2014, pp. 271-282.

Cisco Systems, Inc. "Cisco VN-LINK: Virtualization-Aware Networking," 2009, 9 pages.

Dunbar, et al., "Architecture for Chaining Legacy Layer 4-7 Service Functions," IETF Network Working Group Internet Draft, draft-dunbar-sfc-legacy-14-17-chain-architecture-03.txt, Feb. 10, 2014; 17 pages.

Farrel, A., et al., "A Path Computation Element (PCE)—Based Architecture," RFC 4655, Network Working Group, Aug. 2006, 40 pages.

Jiang, Y., et al., "An Architecture of Service Function Chaining," IETF Network Working Group Internet Draft, draft-jiang-sfc-arch-01.txt, Feb. 14, 2014; 12 pages.

Katsikas, Goergios P., et al., "Profiling and accelerating commodity NFV service chains with SCC," The Journal of Systems and Software, vol. 127, Jan. 2017, pp. 12-27.

Kumbhare, Abhijit, et al., "Opendaylight Service Function Chaining Use-Cases," Oct. 14, 2014, 25 pages.

Li, Hongyu, "Service Function Chaining Use Cases", IETF 88 Vancouver, Nov. 7, 2013, 7 pages.

Mortensen, A., et al., "Distributed Denial of Service (DDoS) Open Threat Signaling Requirements," DOTS, Mar. 18, 2016, 16 pages; https://tools.ietf.org/pdf/draft-ietf-dots-requirements-01.pdf.

Newman, David, "Review: FireEye fights off multi-stage malware," Network World, May 5, 2014, 7 pages.

Nguyen, Kim-Khoa, et al. "Distributed Control Plane Architecture of Next Generation IP Routers," IEEE, 2009, 8 pages.

Quinn, P., et al., "Network Service Header," Network Working Group, Mar. 24, 2015, 42 pages; https://tools.ietf.org/pdf/draft-ietf-sfo-nsh-00.pdf.

Quinn, P., et al., "Network Service Chaining Problem Statement," draft-quinn-nsc-problem-statement-03.txt, Aug. 26, 2013, 18 pages.

Quinn, Paul, et al., "Service Function Chaining: Creating a Service Plane via Network Service Headers," IEEE Computer Society, 2014, pp. 38-44.

Zhang, Ying, et al. "StEERING: A Software-Defined Networking for Inline Service Chaining," IEEE, 2013, IEEE, p. 10 pages.

\* cited by examiner

SECURE COMMUNICATION SESSION RESUMPTION IN A SERVICE FUNCTION CHAIN

TECHNICAL FIELD

The present technology relates generally to secure communication sessions, and more specifically relates to the resumption of Transport Layer Security (TLS) sessions without performing a full TLS handshake.

BACKGROUND

In a session between an endpoint client and an endpoint server secured with the Transport Layer Security (TLS) protocol, one or more Service Function (SF) nodes may act upon the traffic in the session to provide a service function (e.g. firewall, intrusion detection/prevention, traffic compression, etc.). The Service Function node will typically interpose itself into the secure TLS session and create two separate TLS session by acting as a proxy server for the endpoint client and acting as a proxy client for the endpoint server. The TLS session between the endpoint client and the Service Function node is associated with a unique set of cryptographic keys, generated during a TLS handshake. In some embodiments, multiple Service Function nodes can be interposed into the secure TLS session, creating a Service Function Chain (SFC).

If the endpoint client disconnects from the TLS session, it may still retain a copy of the unique set of cryptographic keys. In order to resume the TLS session, the endpoint client must reconnect to the same Service Function node and provide its copy of the unique set of cryptographic keys. In this manner, a full TLS handshake is avoided. If the endpoint client attempts to present its copy of the unique set of cryptographic keys to a different Service Function node, the connection request will be a rejected and a new full TLS handshake will have to be performed.

When no Service Function Chain is present, the endpoint client may be able to easily reconnect to the same Service Function node from the previous TLS session. However, when a Service Function Chain is present, endpoint client communications typically pass first through a Service Function Forwarder (SFF), which performs load balancing in order to determine where to forward an endpoint client communication. Even if the endpoint client presents its copy of the unique set of cryptographic keys, the Service Function node that generated these keys is unknown to the Service Function Forwarder, due to the inherent encryption associated with the TLS protocol. As such, it would be highly desirable to provide an improved method for TLS session resumption, such that a session resume request does not trigger a new TLS handshake, regardless of whether the session resume request is forwarded to the originating Service Function node or a new Service Function node.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only examples of the disclosure and are not therefore to be considered to be limiting of its scope, the principles herein are described and explained with additional specificity and detail through the use of the accompanying drawings in which.

DESCRIPTION OF EXAMPLE EMBODIMENTS

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview

Transport Layer Security, or TLS, is a cryptographic protocol used to provide secured communications between two computing devices, such as a client and a server. First standardized in 1999 as TLS 1.0, the TLS protocol has continued to be developed and updated in order to keep pace with the ever-increasing importance of security and encryption in the modern world. The previous version, TLS 1.2, has been subject to an increasing number of attacks, and the most recent version, TLS 1.3, was introduced in order to address these flaws and provide an overall enhanced security experience.

In order to establish a TLS session between a client and a server, a TLS handshake is performed in order to establish shared cryptographic keys. These shared cryptographic keys are typically uniquely associated with both the TLS session and the client/server devices themselves. As such, if a client wishes to resume a TLS session, the original cryptographic keys can be used to identify the originating server and forward the client resume request accordingly. The original cryptographic keys can then be used to resume the TLS session without having to perform a TLS handshake, reducing latency and increasing efficiency.

TLS 1.2 utilized a clear text message exchange for the TLS handshake, which allowed client resume requests to be easily forwarded to the proper originating server. However, TLS 1.3 now encrypts all TLS handshake messages except for the initial ClientHello, meaning that the association between a client resume request and the originating server is now opaque to other networked devices or forwarders, such as load balancers.

For example, consider a Service Function Forwarder (SFF) acting as a load balancer for various Service Function nodes (e.g. firewalls, intrusion detection/prevention, traffic compression etc.) acting as TLS proxies/servers. Under TLS 1.2, the SFF would receive a client resume request, consult previously observed clear text TLS handshake messages, and identify the originating server and forward the client resume request accordingly. Under TLS 1.3, the SFF would receive a client resume request and would be unable to identify the originating server, due to the encryption of the TLS handshake messages. At best, the SFF could perform normal load balancing, and the client resume request may coincidentally be forwarded to the originating server. However, it is far more likely that the client resume request will not be forwarded to the originating server, and will be forced to perform a new TLS handshake with the new server.

As such, current implementations of TLS 1.3 are often inefficient in terms of both time and computational resources due to new TLS handshakes being forced in response to improperly forwarded client resume requests. Further still, TLS 1.3 breaks many other networking techniques that relied upon the proper forwarding of client resume requests to their originating servers. For example, if a new TLS handshake does not have to be performed, a zero round trip mode (0-RTT) can be employed, where the client resume request contains an initial flight of data for the server to act upon.

Example Embodiments

Figure 1:
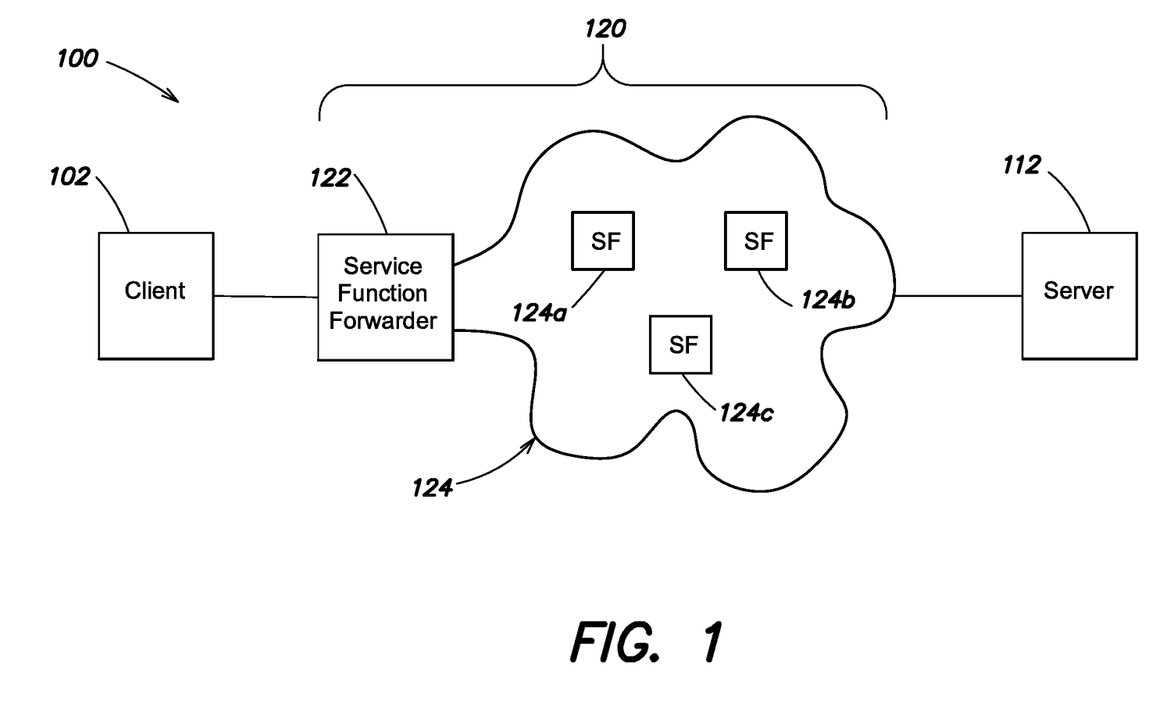
FIG. 1 depicts a diagram of a network system in which embodiments of the present disclosure may operate.

FIG. 1 illustrates a simplified diagram of a network system 100 in which aspects of the present disclosure may operate. Network system 100 includes an endpoint client device 102 (also referred to as "client" or "client device") and an endpoint server device 112 (also referred to as "server" or "server device"). Client 102 and server 112 can communicate secure messages to one another by establishing an encrypted TLS session, using, for example, version 1.3 of the TLS protocol, although it is understood that other versions of the TLS protocol may also be employed.

Interposed between client 102 and server 112 is a Service Function Group 120, comprising a Service Function Forwarder (SFF) 122 communicatively coupled to a plurality of Service Function (SF) nodes 124a-c. In some embodiments, SFF 122 can operate as a load balancer, forwarding traffic from client 102 (or other connected client devices, not shown) to an appropriate or otherwise selected SF node 124a-c.

While three SF nodes are illustrated, it is understood that the plurality of SF nodes can include a greater or lesser number of. In general, each of the plurality of SF nodes 124a-c can provide various service functions to traffic passing through the Service Function Group 120. For example, such traffic might include the secure messages transmitted between client 102 and server 112. The various service functions can include, but are not limited to, firewalls, distributed denial of service (DDOS) protection, intrusion detection/prevention service (IDS/IPS), traffic optimizers, compression services, advertisement insertion, etc. A given one of the plurality of SF nodes 124a-c may be configured to provide one or more specific service functions, or may be configured to provide all of the service functions offered by Service Function Group 120.

In some embodiments, two or more of the plurality of SF nodes 124a-c may be provided on separate network devices or computing devices. In some embodiments, one or more of the SF nodes 124a-c may be provided by a single network device or computing device. Furthermore, the plurality of SF nodes 124a-c may operate on a single communications network, or may operate on a plurality of interconnected communication networks. As would be appreciated by one of ordinary skill in the art, additional modifications to the manner in which Service Function Group 120 distributes and manages the various service functions may be employed without departing from the scope of the present disclosure.

For purposes of clarity of explanation, the following description contemplates a scenario in which SF nodes 124a-c each provide a dedicated service function. Although only client device 102 is illustrated, additional client devices may simultaneously connect to Service Function Forwarder 122, and correspondingly, each of the SF nodes 124a-c may provide a dedicated service function to traffic originating from one or more client devices.

A Service Function Chain (SFC) is formed when two or more service functions are connected. For example, an SFC could be formed between SF node 124a and SF node 124b, wherein SF node 124a might be a firewall and SF node 124b might be a compression service. In this scenario, Service Function Forwarder receives a message stream from client 102, and forwards the message stream to the firewall of SF node 124a. SF node 124a performs firewall filtering, and then forwards the filtered message stream to the compression service of SF node 124b. SF node 124b performs compression, and forwards the compressed message stream to server 112.

In some embodiments, when the TLS protocol is employed to encrypt traffic and message streams, each SF node in the Service Function Chain acts as a TLS proxy or server. In other words, each hop of a message stream between client 102 and server 112 requires its own TLS session, with the exception of Service Function Forwarder 122. Recalling that any given TLS session generates cryptographic keys uniquely corresponding to the two endpoints involved in the given TLS session, consider the context of the current example, wherein client 102 wishes to establish an encrypted TLS session with server 112.

A first proxy TLS session is established between client 102 and SF node 124a, with SF node 124a acting as a proxy server. A second proxy TLS session is established between SF node 124a and SF node 124b, with SF node 124a acting as a proxy client and SF node 124b acting as a proxy server. A third proxy TLS session is established between SF node 124b and server 112, with SF node 124b acting as a proxy client. Three hops are required to transmit a message stream between client 102 and server 112, and a corresponding three TLS sessions (and three sets of cryptographic keys) are generated.

Notably, client 102 is only directly involved in the very first TLS session, i.e. the TLS session connecting client 102 to the first SF node 124a of the Service Function Chain, meaning that client 102 also only exchanges TLS cryptographic keys with SF node 124a, even though the message stream from client 102 also passes through SF node 124b. As such, client 102 and SF node 124b are generally unaware of each other's presence in the communication path. Consequently, session resumption (which requires presenting a copy of the previously generated TLS cryptographic keys to the same SF node that generated said keys) becomes problematic if the session resumption request is directed anywhere but SF node 124a—a problem which is addressed by various aspects of the present disclosure.

Figure 2:
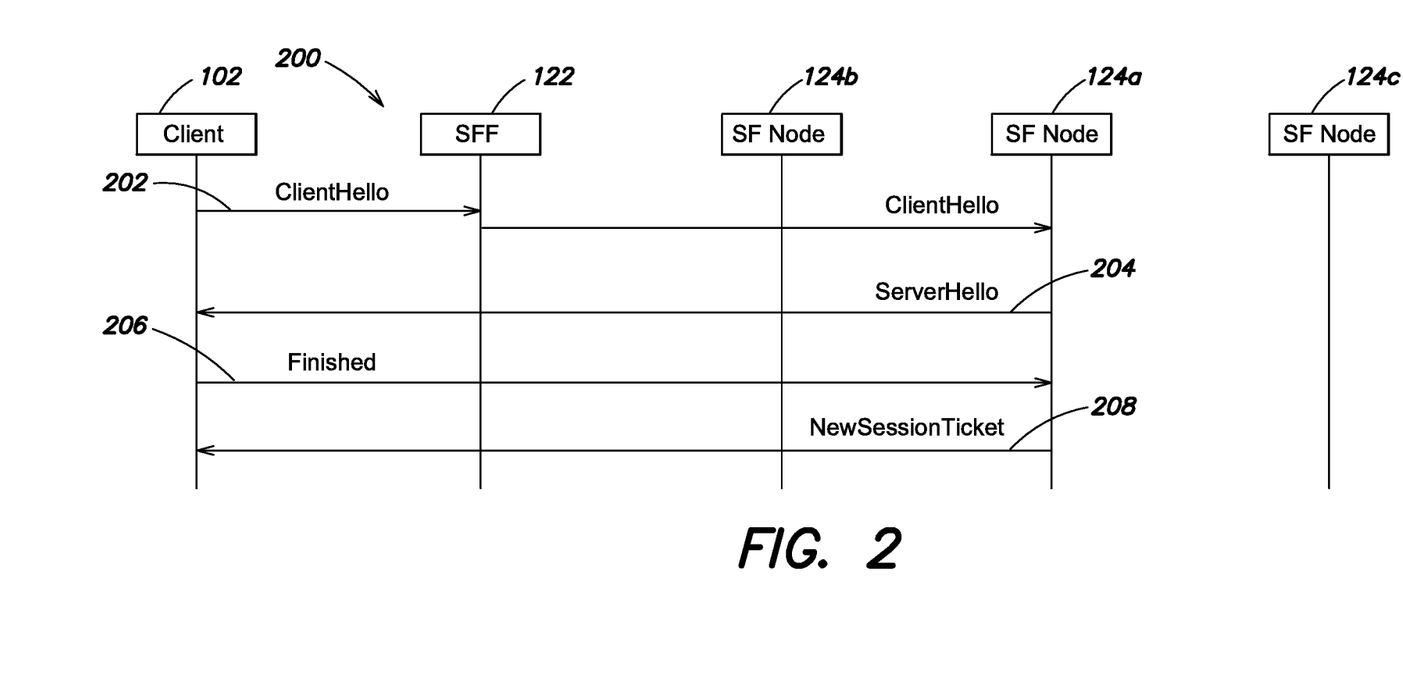
FIG. 2 depicts a ladder diagram of the underlying message exchanged involved in a TLS handshake.

The disclosure now turns to FIG. 2, which depicts a ladder diagram 200 of the underlying message exchange involved in a TLS handshake for the creation of the first TLS session between client 102 and SF node 124a, and the subsequent resumption of the TLS session. Client 102 begins by generating a ClientHello message 202, in accordance with the TLS protocol, which can contain cryptographic keying material or various cryptographic parameters for establishing cryptographic keying material. As discussed previously, while ClientHello message 202 may ultimately be destined for server 112 (not pictured), it is intercepted by Service Function Forwarder 122, which performs load balancing and forwards the ClientHello to an appropriate or otherwise selected Service Function node. In this example, Service Function Forwarder 122 forwards the ClientHello message 202 to SF node 124a.

SF node 124a receives and processes the ClientHello 202, determining the appropriate cryptographic parameters for the TLS session and generating a ServerHello message 204, which is transmitted to client 102 in order to convey the negotiated connection parameters. The ServerHello can contain cryptographic keying material and various other server parameters for establishing the TLS session. In accordance with the TLS protocol, the combination of the ClientHello message 202 and the ServerHello message 204 determines the shared keys that are used to secure and encrypt the TLS session. In some embodiments, Pre-Shared Key (PSK) key establishment can be employed, in which case the ClientHello 202 will contain several offered keys (i.e. PSKs) and the ServerHello 204 will contain an extension indicating which of the PSKs offered by client 102 was selected.

In order to finalize the establishment of the TLS session between client 102 and SF node 124a, client 102 receives and process ServerHello 204 before then transmitting a Finished message 206 to SF node 124a. The Finished message 206 is the final message in the authentication block, and is a Message Authentication Code (MAC) over the entire TLS handshake, which provides key confirmation and binds the identity of client 102 and SF node 124a to the selected keys. In PSK mode, Finished message 206 also authenticates the TLS handshake.

At this point, the TLS handshake is complete, and the first TLS session has been established between client 102 and SF node 124a. With the TLS session established, application-layer data can be exchanged, and is encrypted using the cryptographic keys determined from ClientHello 202 and ServerHello 204. Because this is a new TLS session, client 102 will not send application data prior to sending Finished message 206.

At some subsequent point in time, after Finished message 206 has been transmitted but before the TLS session is terminated, SF node 124a can transmit a NewSessionTicket 208 to client 102. This message creates a pre-shared key (PSK) binding between the ticket value of NewSessionTicket 208 and the resumption master secret. In other words, the client 102 can re-use the cryptographic key previously established in the first TLS session with SF node 124a to then resume the TLS session with SF node 124a at some later point in time, without having to perform another full TLS handshake. To do so, client 102 would include the ticket value of NewSessionTicket 208 in the "pre_shared_key" extension in its ClientHello message.

However, as mentioned previously, such a ClientHello, containing a PSK for TLS session resumption, must be directed to the same SF node that originated the PSK in the previous TLS session. In the context of the present example, a TLS session resumption request from client 102 would have to be forwarded to SF node 124a in order for the TLS session to be resumed without a new TLS handshake and key generation. However, in general, Service Function Forwarder 122 is unable to identify the SF node that generated a given PSK contained within a ClientHello message, due to various limitations of the TLS protocol.

Figure 3:
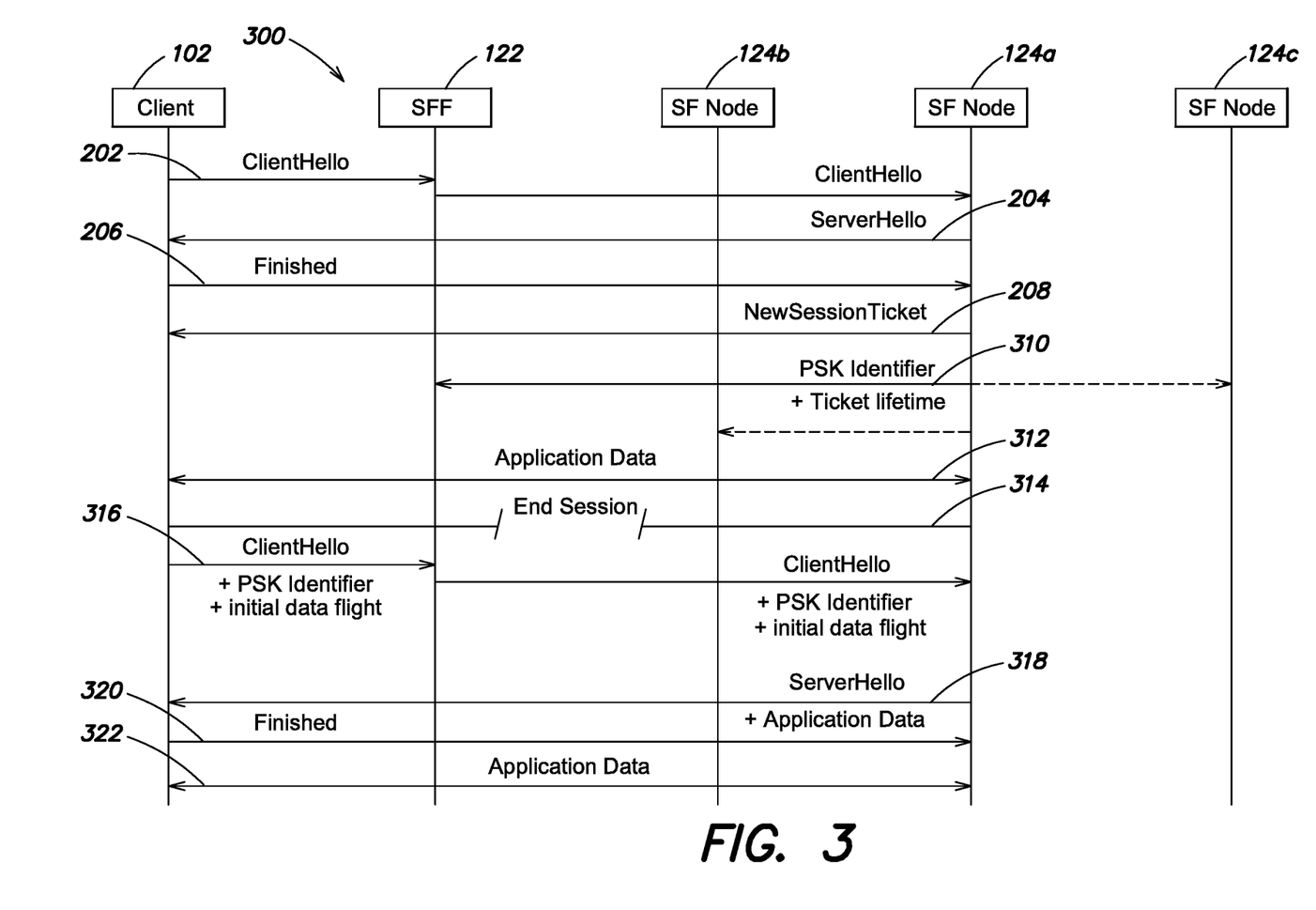
FIG. 3 depicts a ladder diagram of the underlying message exchange of an example embodiment of the present disclosure wherein a Service Function Forwarder forwards a TLS session resume request to the Service Function node that previously handled the session.

Accordingly, FIG. 3 depicts a ladder diagram 300 of the underlying message exchange of an example embodiment of the present disclosure, designed to permit Service Function Forwarder 122 to correctly identify the SF node that generated a given PSK contained within a resume ClientHello message. As illustrated, a TLS session is established between client 102 and SF node 124a in a manner consistent with the above description of FIG. 2. However, after the TLS session has been established, SF node 124a is configured to further transmit a PSK identifier 310 to at least Service Function Forwarder 122. In some embodiments, a corresponding ticket lifetime may additionally be transmitted along with PSK identifier 310. In some embodiments, the transmission of PSK identifier 310 (and any corresponding ticket lifetime) may also be extended to include additional SF nodes of the same Service Function Group (i.e. SF nodes 124b and 124c of Service Function Group 120).

Upon receipt of PSK identifier 310, Service Function Forwarder 122 (and any SF nodes also receiving the PSK identifier) can construct a database or otherwise store in memory the association between the PSK identifier 310 and the originating SF node 124a. In some embodiments, the Service Function Forwarder 122 and the SF nodes may each construct a local memory structure for storing the PSK identifier 310. In some embodiments, a single centralized memory structure can be generated for storing the PSK identifier 310, and can be accessed by the Service Function Forwarder 122 and the SF nodes 124a-c as needed. In either embodiment, the memory structure can be stored in a conventional storage device (e.g. hard drive, solid state drive, etc.) or can be stored in RAM for faster access, and therefore, faster session resumption. Regardless of the specific configuration chosen for storing the PSK identifier 310, Service Function Forwarder 122 can access the memory structure to identify the appropriate originating SF node to forward a resume ClientHello message, as is described in greater detail below.

After PSK identifier 310 is transmitted to Service Function Forwarder 122 and any additional SF nodes, the TLS session between client 102 and SF node 124a continues as normal, exchanging application data 312 before the eventual termination 314 of the TLS session. Note that after terminating the TLS session with SF node 124a, client 102 still retains NewSessionTicket 208, which contains the PSK used in the TLS session and therefore allows session resumption without a new TLS handshake being required.

Thus, when client 102 desires to resume the TLS session, it generates a resume ClientHello message 316, which contains the ticket value of NewSessionTicket 208 in the "pre_shared_key" extension (i.e. the PSK identifier 310). Additionally, a zero round trip mode can be employed, wherein the ClientHello contains an initial flight of data or application data, encrypted using the PSK, such that the TLS session can be established and the initial flight of data immediately decrypted and acted upon, thereby increasing the speed and efficiency of the TLS session resumption.

The resume ClientHello message 316 is received at Service Function Forwarder 122, which parses the message to extract PSK identifier 310. Service Function Forwarder 122 may also extract and validate the corresponding ticket lifetime of PSK identifier 310 before proceeding. With the PSK identifier 310 extracted, Service Function Forwarder 122 then consults its database or memory structure to determine the specific SF node that is associated with PSK identifier 310, and therefore, is associated with the previous TLS session.

In this case, Service Function Forwarder 122 consults its database or memory structure and determines that the PSK identifier 310 contained within resume ClientHello message 316 was generated by SF node 124a, and therefore forwards resume ClientHello message 316 to SF node 124a. The TLS session then resumes using the same PSK that was used in the original TLS session between client 102 and SF node 124a.

If, for some reason, Service Function Forwarder 122 makes an error or otherwise fails to forward resume ClientHello message 316 to SF node 124a, the situation may still be resolved without resorting to a new TLS handshake. For example, if resume ClientHello message 316 is forwarded to SF node 124b, SF node 124b can extract the PSK identifier 310 and determine that the PSK identifier was generated by a different SF node. SF node 124b can then consult its memory structure, whether local or centralized, to determine that SF node 124a was the actual SF node that originated PSK identifier 310. On the basis of this determination, SF node 124b can redirect the resume ClientHello message 316 to SF node 124a, where the TLS session then resumes using the same PSK that was used in the original TLS session between client 102 and SF node 124a.

Advantageously, the TLS session has been resumed with a single transmission from client 102, and, using the same PSK as in the previous TLS session, SF node 124a is able to immediately act upon and decrypt any initial flight of data contained in resume ClientHello message 316. Accordingly, SF node 124a then generates a ServerHello message 318, as described previously, which also further includes corresponding application data responsive to the initial flight of data contained within resume ClientHello message 316. With the TLS session resumed, it then proceeds as normal, with the transmission of a Finished message 320 from client 102 and a subsequent exchange of application data 322.

In some embodiments, the PSK identifier and other data transmitted amongst the plurality of Service Function nodes 124a-c and the Service Function Forwarder 122 is shared using a publish-subscribe mechanism, as is known in the art. In such an embodiment, the SF node generating a NewSessionTicket and a new TLS session can be the publishing node. In some embodiments, the PSK identifier and other data transmitted amongst the plurality of Service Function nods 124a-c and the Service Function Forwarder 122 is shared via encapsulation in Network Service Header (NSH) metadata. In particular, an NSH Metadata-Type 2 Type Length Value (NSH MD-Type 2 TLV) can be employed.

Furthermore, various transport protocols can be employed with any of the TLS sessions referenced herein. For example, transport protocols might include TCP (Transmission Control Protocol) and QUIC (Quick UDP Internet Connections). In some scenarios, TCP Fast Start may be employed in order to transmit an initial flight of zero round trip data in the ClientHello. In particular, TCP Fast Start allows the initial fight of data to be carried in SYN and SYN-ACK packets. In the context of the example of FIG. 3, if Service Function Forwarder 122 detects a TLS ClientHello message, such as ClientHello 316, within a SYN packet carrying the PSK extension, then Service Function Forwarder 122 will extract PSK identifier 310 from the SYN packet. The process of identifying the originating SF node corresponding to PSK identifier 310 then proceeds as described above, and Service Function Forwarder 122 then forwards the SYN packet and all subsequent packets in the TCP session to the originating SF node 124a.

QUIC also supports an initial flight of zero round trip data. QUIC runs over UDP (User Datagram Protocol), and Service Function Forwarder 122 can identify a QUIC packet on a new connection based on the public header fields of the packet. When Service Function Forwarder 122 sees a TLS ClientHello message, such as ClientHello 316, carrying a PSK extension, then Service Function Forwarder 122 will extract PSK identifier 310 from the QUIC packet. The process of identifying the originating SF node corresponding to PSK identifier 310 then proceeds as described above, and Service Function Forwarder 122 then forwards the QUIC packet and all subsequent packets in the QUIC session to the originating SF node 124a. Unlike TCP, where TLS exchange takes place after the TLS handshake, UDP has no such dependency. Therefore, a Service Function node acting as a QUIC proxy or server in a TLS session would need only to convey the PSK identifier 310 and the corresponding ticket lifetime, using NSH in a new NSH TLV, to the Service Function Forwarder 122. As a QUIC proxy or server, it would not be strictly necessary for a Service Function node to convey the actual PSK itself. In some embodiments, when the QUIC connection is terminated, the Service Function node associated with the QUIC connection can share the information that the QUIC connection is closed by using NSH in a new NSH TLV to Service Function Forwarder 122. On the basis of this received information, Service Function Forwarder 122 can remove the state that it maintains for the now closed QUIC connection. Normally, Service Function Forwarder 122 would not be able to make such a determination, as the "CONNECTION_CLOSE" frame used to terminate the QUIC connection is encrypted, and therefore not visible to Service Function Forwarder 122.

Figure 4:
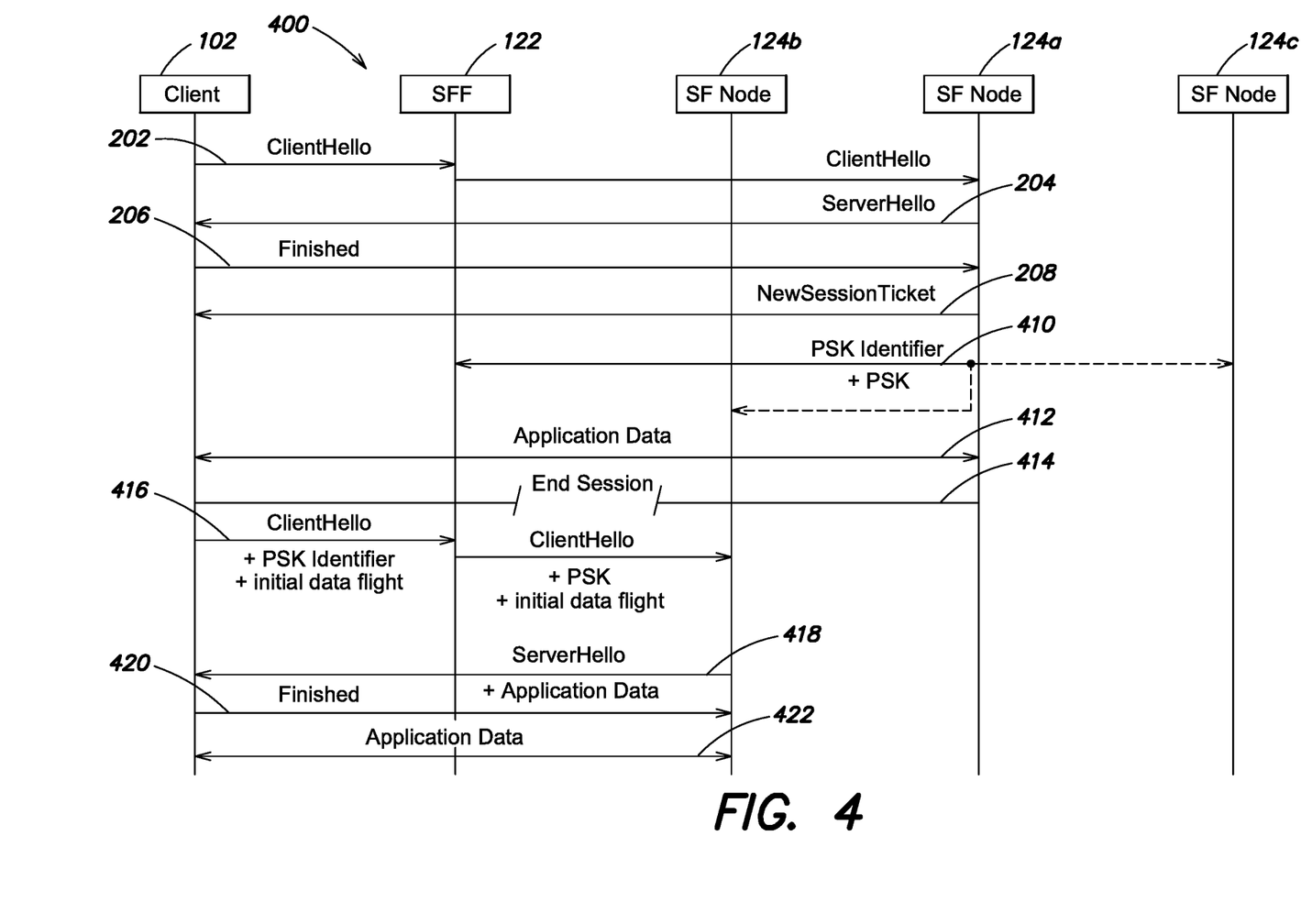
FIG. 4 depicts a ladder diagram of the underlying message exchange of an example embodiment of the present disclosure wherein a TLS session is resumed at a new Service Function node.

While FIG. 3 is directed towards an embodiment in which a resume ClientHello message is forwarded to the same SF node that originated the PSK and handled the previous TLS session, it is also contemplated that a resume ClientHello message can be forwarded to any SF node and the TLS session can be resumed without requiring a full TLS handshake. Accordingly, FIG. 4 depicts a ladder diagram 400 of the underlying message exchange of an example embodiment of the present disclosure, designed to permit a TLS session to be resumed at any SF node without requiring a full TLS handshake. As illustrated, a TLS session is first established between client 102 and SF node 124a in a manner consistent with the above description of FIGS. 2 and 3.

However, when SF node 124a transmits PSK identifier 410 to Service Function Forwarder 122, it additionally transmits the PSK itself, using, for example, either the publish-subscribe or NSH encapsulation mechanisms described above. As is illustrated, SF node 124a may additionally transmit PSK identifier 410 and the PSK itself to additional SF nodes of the same Service Function Group (i.e. SF nodes 124b and 124c of Service Function Group 120), prior to or concurrent with the Application Data 412, and before the End Session 414.

Upon receipt of PSK identifier 410 and the PSK, Service Function Forwarder 122 and any SF nodes also receiving the PSK identifier and PSK can construct a database or otherwise store in memory the association between the PSK identifier 410 and the PSK. In some embodiments, the Service Function Forwarder 122 and the SF nodes may each construct a local memory structure for storing the PSK identifier 410 and the PSK. In some embodiments, a single centralized memory structure can be generated for storing the PSK identifier 410 and the PSK, and can be accessed by the Service Function Forwarder 122 and the SF nodes 124*a-c* as needed. In either embodiment, the memory structure can be stored in a conventional storage device (e.g. hard drive, solid state drive, etc.) or can be stored in RAM for faster access, and therefore, faster session resumption.

Thus, when client 102 desires to resume the TLS session, it generates a resume ClientHello message 416, which contains the ticket value of NewSessionTicket 208 in the "pre_shared_key" extension (i.e. the PSK identifier 410). If a zero round trip mode is employed, ClientHello 416 can also include an initial flight of data. The resume ClientHello message 416 is then received at Service Function Forwarder 122. In one embodiment, Service Function Forwarder 122 parses the message to extract PSK identifier 410. With the PSK identifier 410 extracted, Service Function Forwarder 122 then consults its database or memory structure (local or centralized) to determine and retrieve the PSK that is associated with PSK identifier 410, and therefore, is associated with the previous TLS session. Service Function Forwarder 122 then selects an SF node to forward the resume ClientHello message 416 to. This selection can be performed based off of various factors for load balancing or otherwise controlling the plurality of SF nodes underneath the control of Service Function Forwarder 122. As illustrated, Service Function Forwarder selects SF node 124*b*, and forwards the resume ClientHello message 416 and the PSK that is associated with PSK identifier 410. Consequently, although SF node 124*b* did not handle the previous TLS session with client 102, it receives the PSK that was used to encrypt the previous TLS session, and therefore is able to handle the resumed TLS session with client 102.

In another embodiment, Service Function Forwarder may immediately forward resume ClientHello message 416 to a selected SF node, without also including the PSK associated with PSK identifier 410. In this embodiment, SF node 124*b* receives the resume ClientHello message 416 and extracts PSK identifier 410. Based upon a determination that PSK identifier 410 was generated by a different SF node, SF node 124*b* consults its database or memory structure (local or centralized) to retrieve the PSK associated with the PSK identifier 410. Once the appropriate PSK is retrieved, SF node 124*b* is able to handle the resumed TLS session with client 102, even though SF node 124*b* did not handle the initial or prior TLS session with client 102.

In either embodiment, no additional TLS handshake is required, and the original PSK used to encrypt the first TLS session is re-used by the new SF node 124*b*. In this manner, whenever a new TLS session is established within the Service Function Group 120, the PSK identifier and the associated PSK are circulated and stored such that client 102 can resume its TLS session with any SF node connected to Service Function Forwarder 122. When the ClientHello message 416 includes an initial flight of data, the corresponding ServerHello message 418 can likewise include Application Data, thereby allowing the TLS session to resume immediately (i.e. with zero round trip time). Once resumed, the TLS session may proceed as described previously, with client 102 transmitting a Finished message 420, thereby triggering two way communication of Application Data 422 between client 102 and the new SF node 124*b*.

Figure 5:
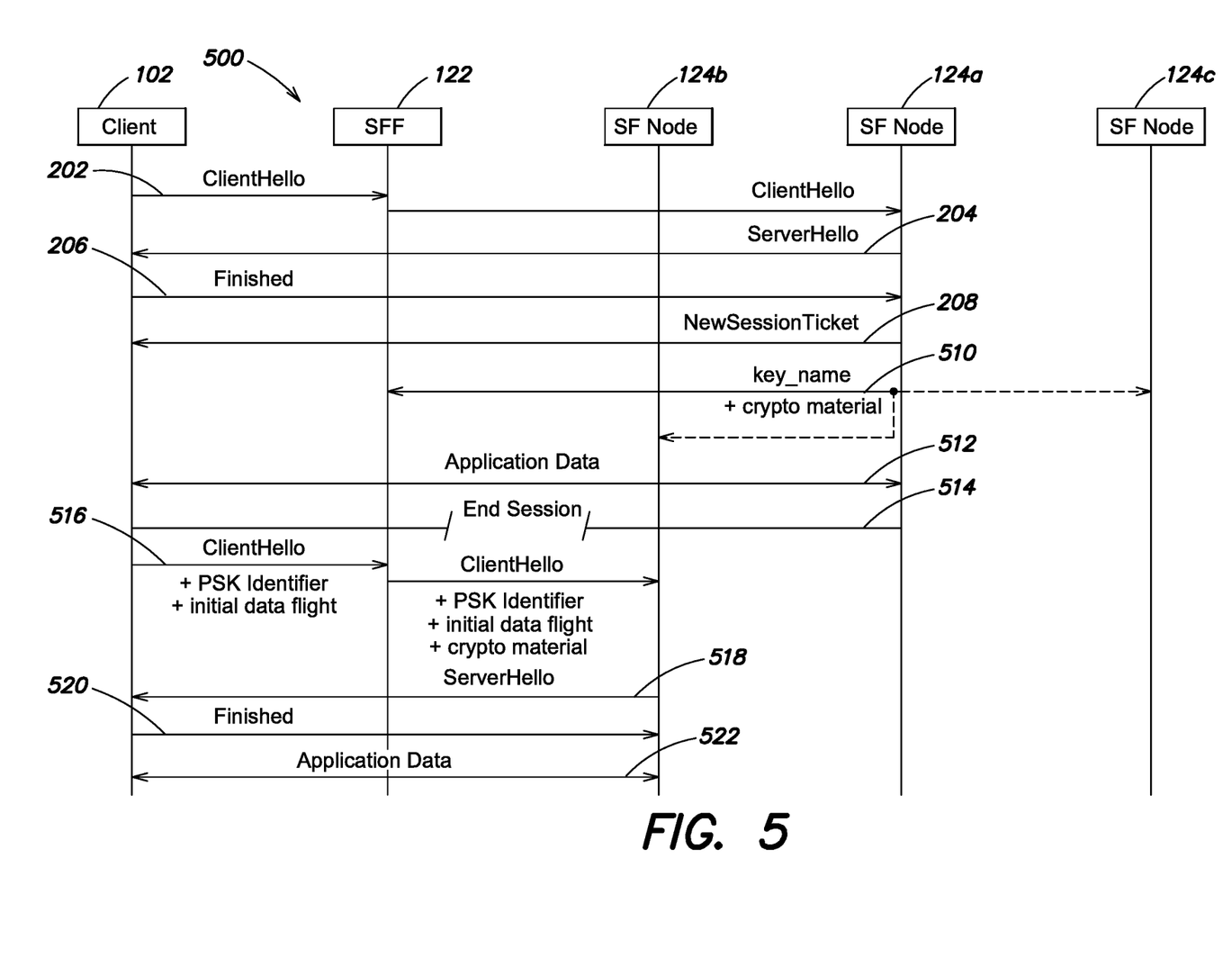
FIG. 5 depicts a ladder diagram of the underlying message exchange of an example embodiment of the present disclosure wherein an encrypted Pre-Shared Key is included in a TLS session resume request.

It can be desirable to provide an additional level of security by encrypting the PSK before it is transmitted. FIG. 5 depicts a ladder diagram 500 of the underlying message exchange of an example embodiment of the present disclosure, wherein the transmission of an encrypted PSK and associated decrypting material can permit a TLS session to be resumed at any SF node without requiring a full TLS handshake. As illustrated, a TLS session is first established between client 102 and SF node 124*a* in a manner consistent with the above description of FIGS. 2 and 3.

However, rather than transmitting a standard PSK identifier, SF node 124*a* instead transmits a PSK identifier that is a self-contained and self-authenticated ticket that can be decrypted to obtain the PSK for the TLS session. In addition to the self-contained and self-authenticated ticket, SF node 124*a* additionally transmits cryptographic data 510, comprising a key identifier (e.g. the "key name" value) and the required cryptographic keying material for decrypting the self-contained and self-authenticated ticket. As described previously, the required cryptographic keying material and the key identifier of cryptographic data 510 can be stored in a database or memory structure, either centrally located or localized. Similarly, SF node 124*a* can transmit the cryptographic data 510 to one or more of Service Function Forwarder 122 and the plurality of SF nodes 124*a-c* that are connected to the Service Function Forwarder, prior to or concurrent with the Application Data 512, and before the End Session 514.

Thus, when client 102 desires to resume a TLS session, it generates a resume ClientHello message 516, which contains the self-contained and self-authenticated ticket in the "pre_shared_key" extension. If a zero round trip mode is employed, ClientHello 516 can also include an initial flight of data. The resume ClientHello message 516 is then received at Service Function Forwarder 122, which can perform load balancing or other forwarding logic to select an SF node to forward the resume ClientHello to. As illustrated, the selected node is SF node 124*b*. In one embodiment, Service Function Forwarder 122 parses ClientHello message 516 to extract the self-contained and self-authenticated ticket. Service Function Forwarder 122 then consults the database or memory structure to determine and retrieve, based on the key identifier, the required cryptographic keying material for decrypting the self-contained and self-authenticated ticket. Service Function Forwarder 122 then forwards resume ClientHello message 516 and the required cryptographic keying material for decrypting the self-contained and self-authenticated ticket to SF node 124*b*. Upon receipt, SF node 124*b* extracts the self-contained and self-authenticated ticket from resume ClientHello message 516, and utilizes the required cryptographic keying material received from the Service Function Forwarder 122 to decrypt the self-contained and self-authenticated ticket, thereby obtaining the PSK used to encrypt the previous TLS session between client 102 and SF node 124*a*. In this manner, SF node 124*b* is able to handle the resume TLS session with client 102, even though SF node 124*b* had no previous involvement in the prior TLS session.

In another embodiment, Service Function Forwarder 122 performs load balancing or other forwarding logic and immediately forwards resume ClientHello message 516 to the selected SF node 124*b*. Upon receipt, SF node 124*b* extracts the self-contained self-authenticated ticket from the PSK identifier of the ClientHello, and consults the database or memory structure to retrieve the required cryptographic keying material, based upon the key identifier. Once retrieved, SF node 124*b* uses the required cryptographic keying material to decrypt the self-contained and self-authenticated ticket, thereby obtaining the PSK used to encrypt the previous TLS session between client 102 and SF node 124*a*.

In either embodiment, no additional TLS handshake is required, and the TLS session is able to resume quickly and seamlessly because the original PSK used to encrypt the first TLS session is re-used by the new SF node 124*b*. In this manner, whenever a new TLS session is established within the Service Function Group 120, the key identifier and required cryptographic keying material of cryptographic data 510 are circulated and stored such that client 102 can resume its TLS session with any SF node connected to Service Function Forwarder 122. When the ClientHello message 516 includes an initial flight of data, the corresponding ServerHello message 518 can likewise include Application Data, thereby allowing the TLS session to resume immediately (i.e. with zero round trip time). Once resumed, the TLS session may proceed as described previously, with client 102 transmitting a Finished message 520, thereby triggering two way communication of Application Data 522 between client 102 and the new SF node 124*b*.

In general, methods of the present disclosure bring increased visibility of TLS sessions and their corresponding originating SF node to one or more of the Service Function Forwarder and the plurality of coupled SF nodes. Accordingly, new and improved methods for TLS session resumption are provided, such that the Service Function Forwarder can build and maintain a database or memory structure that tracks the associations between PSKs and their originating SF node. With this information, the Service Function Forwarder is capable of forwarding client resume requests to the same SF node that previously handled the TLS session with the client. Alternatively, the present disclosure also enables a different, new SF node to handle the TLS session resumption without forcing a new TLS handshake, by permitting the new SF node to locate and retrieve the same PSK that was used to encrypt the previous TLS session. In a first approach, the PSK is stored in a database or memory structure along with a corresponding PSK identifier. In a second approach, the PSK is stored in encrypted form in a self-contained and self-authenticating ticket that is transmitted to the new SF node, and the required cryptographic keying material to decrypt and extract the PSK is stored in a database or memory structure. By virtue of the present disclosure, client devices can thus resume TLS sessions at any SF node without having to perform a new TLS handshake, saving time and reducing unnecessary usage of computational resources.

Figure 6A:
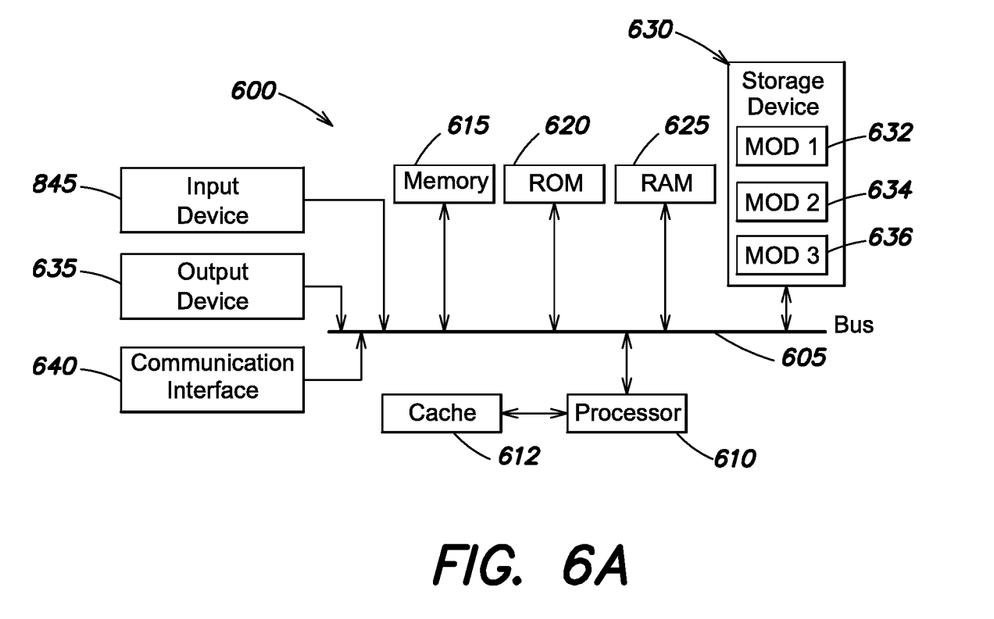
FIG. 6A depicts a conventional system bus computing system architecture.
Figure 6B:
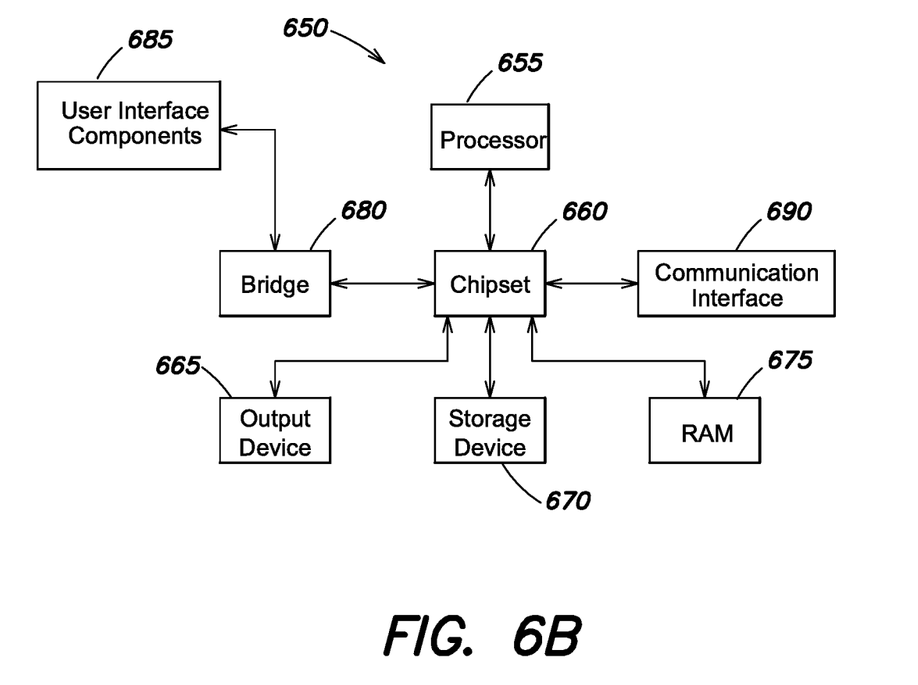
FIG. 6B depicts an example computer system having a chipset architecture.

FIG. 6A and FIG. 6B illustrate example system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates an example computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output device 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 665 and execute appropriate functions, such as browsing functions by interpreting these inputs using processor 655.

It can be appreciated that example systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

What is claimed is:

1. A method comprising:
    receiving, at a first Service Function (SF) node, a request to establish a Transport Layer Security (TLS) session, the first SF node being one of a plurality of SF nodes communicatively coupled to a Service Function Forwarder (SFF);
    generating a Pre-Shared Key (PSK) and a PSK identifier, the PSK and the PSK identifier uniquely corresponding to the first SF node and the TLS session;
    forwarding the PSK identifier to the SFF and/or one or more of the plurality of SF nodes, the forwarding including encapsulating the PSK identifier in Network Service Header (NSH) metadata;
    receiving a connection request from a client device, the client device having previously disconnected from the TLS session;
    determining the connection request contains the PSK identifier;
    selecting a second SF node and using the PSK to re-establish the TLS session between the client device and the second SF node; and
    using an NSH Metadata-Type 2 Type Length Value (NSH MD-Type 2 TLV) to indicate a Quick UDP Internet Connections (QUIC) connection has been closed with the SFF and/or the plurality of SF nodes.

2. The method of claim 1, wherein the second SF node is selected by determining the second SF node is uniquely associated with the PSK identifier from the connection request, such that the second SF node and the first SF node are the same node.

3. The method of claim 2, wherein the connection request is carried by a Transmission Control Protocol (TCP) SYN packet, such that the second SF node determines the TCP SYN packet contains the PSK identifier, and uses the PSK to decrypt and process an initial flight of data contained in the TCP SYN packet.

4. The method of claim 2, wherein the connection request is carried by a Quick UDP Internet Connections (QUIC) packet, such that the second SF node determines the QUIC packet contains the PSK identifier, and uses the PSK to decrypt and process an initial flight of data contained in the QUIC packet.

5. The method of claim 1, wherein the second SF node is selected by performing load balancing at the SFF, such that the second SF node can be any one of the plurality of SF nodes.

6. The method of claim 5, wherein the PSK is stored as an entry in a memory structure and the PSK identifier is a corresponding entry lookup key for the PSK, such that the second SF node extracts the PSK identifier from the connection request and obtains the PSK from the memory structure in order to re-establish the TLS session.

7. The method of claim 5, wherein the PSK identifier comprises a self-contained ticket containing an encrypted copy of the PSK, and wherein the second SF node receives required cryptographic keying material to decrypt the PSK from the SFF and/or one or more of the plurality of SF nodes, such that the second SF node extracts the PSK from the self-contained ticket in order to re-establish the TLS session.

8. The method of claim 1, wherein forwarding the PSK identifier to the SFF and/or one or more of the plurality of SF nodes comprises a publish-subscribe mechanism.

9. A computer-readable device having stored therein instructions which, when executed by at least one processor, cause the at least one processor to perform operations comprising:
receiving, at a first Service Function (SF) node, a request to establish a Transport Layer Security (TLS) session, the first SF node being one of a plurality of SF nodes communicatively coupled to a Service Function Forwarder (SFF);
generating a Pre-Shared Key (PSK) and a PSK identifier, the PSK and the PSK identifier uniquely corresponding to the first SF node and the TLS session;
forwarding the PSK identifier to the SFF and/or one or more of the plurality of SF nodes, the forwarding including encapsulating the PSK identifier in Network Service Header (NSH) metadata;
receiving a connection request from a client device, the client device having previously disconnected from the TLS session;
determining the connection request contains the PSK identifier;
selecting a second SF node and using the PSK to re-establish the TLS session between the client device and the second SF node; and
using an NSH Metadata-Type 2 Type Length Value (NSH MD-Type 2 TLV) to indicate a Quick UDP Internet Connections (QUIC) connection has been closed with the SFF and/or the plurality of SF nodes.

10. The computer-readable device of claim 9, wherein the instructions further cause the at least one processor to select the second SF node by determining the SF node is uniquely associated with the PSK identifier from the connection request, such that the second SF node and the first SF node are the same node.

11. The computer-readable device of claim 10, wherein the connection request is carried by a Transmission Control Protocol (TCP) SYN packet, such that the second SF node determines the TCP SYN packet contains the PSK identifier, and uses the PSK to decrypt and process an initial flight of data contained in the TCP SYN packet.

12. The computer-readable device of claim 10, wherein the connection request is carried by a Quick UDP Internet Connections (QUIC) packet, such that the second SF node determines the QUIC packet contains the PSK identifier, and uses the PSK to decrypt and process an initial flight of data contained in the QUIC packet.

13. The computer-readable device of claim 9, wherein the instructions further cause the at least one processor to select the second SF node by performing load balancing at the SFF, such that the second SF node can be any one of the plurality of SF nodes.

14. The computer-readable device of claim 13, wherein the PSK is stored as an entry in a memory structure and the PSK identifier is a corresponding entry lookup key for the PSK, such that the second SF node extracts the PSK identifier from the connection request and obtains the PSK from the memory structure in order to re-establish the TLS session.

15. The computer-readable device of claim 13, wherein the PSK identifier comprises a self-contained ticket containing an encrypted copy of the PSK, and wherein the second SF node receives required cryptographic keying material to decrypt the PSK from the SFF and/or one or more of the plurality of SF nodes, such that the second SF node extracts the PSK from the self-contained ticket in order to re-establish the TLS session.

16. The computer-readable device of claim 9, wherein the instructions further cause the at least one processor to forward the PSK identifier to the SFF and/or one or more of the plurality of SF nodes with a publish-subscribe mechanism or a modification of Network Service Header (NSH) metadata.

* * * * *